(12) United States Patent
Assa et al.

(10) Patent No.: US 7,394,479 B2
(45) Date of Patent: Jul. 1, 2008

(54) PULSED LASER PRINTING

(75) Inventors: Shlomo Assa, San Diego, CA (US);
Steven Meyer, San Diego, CA (US);
Mark Rapposelli, San Diego, CA (US);
John F. Stine, Murrieta, CA (US)

(73) Assignee: Marken Corporation, Keene, NH (US)

( * ) Notice: Subject to any disclaimer, the term of this patent is extended or adjusted under 35 U.S.C. 154(b) by 73 days.

(21) Appl. No.: 11/071,671

(22) Filed: Mar. 2, 2005

(65) Prior Publication Data

US 2006/0197826 A1    Sep. 7, 2006

(51) Int. Cl.
*B41J 2/47* (2006.01)
*B41J 2/435* (2006.01)

(52) U.S. Cl. .................. 347/251; 347/253; 347/254; 347/246; 347/247

(58) Field of Classification Search ......... 347/246–247, 347/253–254, 251
See application file for complete search history.

(56) References Cited

U.S. PATENT DOCUMENTS

| | | | |
|---|---|---|---|
| 3,571,554 A | 3/1971 | Baujoin | |
| 3,648,601 A | 3/1972 | Weidman | |
| 3,714,393 A | 1/1973 | Johnson et al. | |
| 3,725,655 A | 4/1973 | Edstrom et al. | |
| 3,761,675 A | 9/1973 | Mason et al. | |
| 3,803,637 A | 4/1974 | Martin et al. | |
| 3,824,015 A | 7/1974 | Petit et al. | |
| 3,848,104 A | 11/1974 | Locke | |
| 3,863,565 A | 2/1975 | Patykula | |
| 3,885,873 A | 5/1975 | Andermo | |
| 3,898,417 A | 8/1975 | Atkinson | |
| 3,975,261 A | 8/1976 | Beck | |
| 4,011,437 A | 3/1977 | Hohn | |

(Continued)

FOREIGN PATENT DOCUMENTS

DE    400476    4/1922

(Continued)

OTHER PUBLICATIONS

Allen, L. "Automatic Identification: How Do You Choose It, & Where Do You Use It?", *Automation*, Jul. 1991.

(Continued)

*Primary Examiner*—Hai C Pham
*Assistant Examiner*—Kainoa B Wright
(74) *Attorney, Agent, or Firm*—Fish & Richardson P.C.

(57) ABSTRACT

The present disclosure includes systems and techniques relating to pulse laser printing. In general, in one implementation, an apparatus includes: a laser operable to produce a pulsed printing beam; an optics assembly operable to focus and direct the pulsed printing beam; and electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol. The electronics may deliver the power pulses in synchronization with arrival at the predefined locations, and the electronics may be configured to receive sensed feedback in a closed loop.

15 Claims, 3 Drawing Sheets

U.S. PATENT DOCUMENTS

| | | |
|---|---|---|
| 4,024,545 A | 5/1977 | Dowling et al. |
| 4,025,752 A | 5/1977 | Whitman, III |
| 4,049,945 A | 9/1977 | Ehlscheid et al. |
| 4,063,064 A | 12/1977 | Saunders et al. |
| 4,065,212 A | 12/1977 | Belleson et al. |
| 4,083,053 A | 4/1978 | Ouchi et al. |
| 4,086,522 A | 4/1978 | Engelberger et al. |
| 4,088,864 A | 5/1978 | Theeuwes et al. |
| 4,099,830 A | 7/1978 | Whittle et al. |
| 4,100,599 A | 7/1978 | Nally |
| 4,106,965 A | 8/1978 | Lee |
| 4,154,530 A | 5/1979 | Connolly, Jr. et al. |
| 4,160,894 A | 7/1979 | Stemmler et al. |
| 4,207,985 A | 6/1980 | Lockett et al. |
| 4,218,606 A | 8/1980 | Whitman, III |
| 4,240,017 A | 12/1980 | Uekusa |
| 4,271,968 A | 6/1981 | Mehrkame et al. |
| 4,283,145 A | 8/1981 | Miyazawa |
| 4,285,012 A | 8/1981 | Ohara et al. |
| 4,297,559 A | 10/1981 | Whitman, III |
| 4,307,282 A | 12/1981 | Gappa |
| 4,319,122 A | 3/1982 | Pope et al. |
| 4,323,755 A | 4/1982 | Nierenberg |
| 4,334,471 A | 6/1982 | Noyes et al. |
| 4,338,114 A | 7/1982 | Brockway et al. |
| 4,338,147 A | 7/1982 | Backstrom et al. |
| 4,354,196 A | 10/1982 | Neumann et al. |
| 4,371,782 A | 2/1983 | Brouwer |
| 4,375,025 A | 2/1983 | Carlson |
| 4,404,454 A | 9/1983 | Taylor et al. |
| 4,468,551 A | 8/1984 | Neiheisel |
| 4,480,169 A | 10/1984 | Macken |
| 4,497,995 A | 2/1985 | Nilsen |
| 4,517,436 A | 5/1985 | Lawrence |
| 4,557,386 A | 12/1985 | Buckley et al. |
| 4,560,856 A | 12/1985 | Miller et al. |
| 4,564,739 A | 1/1986 | Mattelin |
| 4,576,286 A | 3/1986 | Buckley et al. |
| 4,578,329 A | 3/1986 | Holsappel |
| 4,584,455 A | 4/1986 | Tomizawa |
| 4,587,396 A | 5/1986 | Rubin |
| 4,590,859 A | 5/1986 | Pou et al. |
| 4,618,759 A | 10/1986 | Muller et al. |
| 4,626,649 A | 12/1986 | Dupeyrat |
| 4,626,656 A | 12/1986 | Ootsuka et al. |
| 4,636,043 A | 1/1987 | Bellar |
| 4,638,144 A | 1/1987 | Latta, Jr. |
| 4,648,093 A | 3/1987 | Sasnett et al. |
| 4,652,722 A | 3/1987 | Stone et al. |
| 4,675,498 A | 6/1987 | Lemelson |
| 4,695,698 A | 9/1987 | Mayor et al. |
| 4,696,143 A | 9/1987 | Young |
| 4,703,166 A | 10/1987 | Bruning |
| 4,707,596 A | 11/1987 | Hohberg |
| 4,707,709 A | 11/1987 | Tsilibes |
| 4,720,618 A | 1/1988 | Stamer et al. |
| 4,725,709 A | 2/1988 | Mattelin |
| 4,727,235 A | 2/1988 | Stamer et al. |
| 4,734,558 A | 3/1988 | Nakano et al. |
| 4,736,187 A | 4/1988 | Kibrick et al. |
| 4,742,206 A | 5/1988 | Dietterich et al. |
| 4,758,703 A | 7/1988 | Drever et al. |
| 4,769,310 A | 9/1988 | Gugger et al. |
| 4,791,267 A | 12/1988 | Yokoyama et al. |
| 4,796,038 A | 1/1989 | Allen et al. |
| 4,797,532 A | 1/1989 | Maiorov |
| 4,799,215 A | 1/1989 | Suzuki |
| 4,803,336 A | 2/1989 | Myer |
| 4,806,727 A | 2/1989 | Ruckl |
| 4,808,790 A | 2/1989 | Ruckl |
| 4,822,973 A | 4/1989 | Fahner et al. |
| 4,852,020 A | 7/1989 | Morita |
| 4,854,696 A | 8/1989 | Guez |
| 4,861,620 A | 8/1989 | Azuma et al. |
| 4,870,623 A | 9/1989 | Buckley et al. |
| 4,874,919 A | 10/1989 | Bransden et al. |
| 4,901,073 A | 2/1990 | Kibrick |
| 4,906,813 A | 3/1990 | Gajdos |
| 4,914,437 A | 4/1990 | Kibrick et al. |
| 4,918,284 A | 4/1990 | Weisz |
| 4,941,082 A | 7/1990 | Pailthorp et al. |
| 4,952,789 A | 8/1990 | Suttie |
| 4,956,539 A | 9/1990 | Uesugi et al. |
| 4,965,829 A | 10/1990 | Lemelson |
| 4,969,134 A | 11/1990 | Balderson |
| 4,970,366 A * | 11/1990 | Imatou et al. .......... 219/121.68 |
| 4,970,600 A | 11/1990 | Garnier et al. |
| 4,987,287 A | 1/1991 | Jack |
| 5,021,631 A | 6/1991 | Ravellat |
| 5,041,716 A | 8/1991 | Wakabayashi |
| 5,049,721 A | 9/1991 | Parnas et al. |
| 5,051,558 A | 9/1991 | Sukhman |
| 5,087,805 A | 2/1992 | Silverschotz et al. |
| 5,109,149 A | 4/1992 | Leung |
| 5,120,928 A | 6/1992 | Piliero |
| 5,132,510 A | 7/1992 | Klingel et al. |
| 5,166,505 A | 11/1992 | Gorriz et al. |
| 5,168,454 A | 12/1992 | LaPlante et al. |
| 5,170,279 A | 12/1992 | Schwartz et al. |
| 5,175,425 A | 12/1992 | Spratte et al. |
| 5,206,496 A | 4/1993 | Clement et al. |
| 5,229,573 A | 7/1993 | Stone et al. |
| 5,229,574 A | 7/1993 | Stone |
| 5,262,613 A | 11/1993 | Norris et al. |
| 5,283,773 A | 2/1994 | Thomas et al. |
| 5,294,942 A | 3/1994 | Loewenthal et al. |
| 5,327,529 A | 7/1994 | Fults et al. |
| 5,329,090 A | 7/1994 | Woelki et al. |
| 5,367,152 A | 11/1994 | Krichever et al. |
| 5,375,722 A | 12/1994 | Leary et al. |
| 5,401,960 A | 3/1995 | Fisun et al. |
| 5,515,480 A | 5/1996 | Frazier |
| 5,605,641 A | 2/1997 | Chiba et al. |
| 5,653,900 A | 8/1997 | Clement et al. |
| 5,680,384 A | 10/1997 | Seki et al. |
| 5,734,412 A | 3/1998 | Hasebe et al. |
| 5,751,436 A | 5/1998 | Kwon et al. |
| 5,767,483 A | 6/1998 | Cameraon et al. |
| 5,900,948 A | 5/1999 | Shigeeda et al. |
| 5,906,609 A | 5/1999 | Assa et al. |
| 5,938,657 A * | 8/1999 | Assa et al. .................... 606/9 |
| 5,966,457 A | 10/1999 | Lemelson |
| 5,990,444 A | 11/1999 | Costin |
| 6,049,055 A | 4/2000 | Fannash et al. |
| 6,061,081 A | 5/2000 | Hasebe et al. |
| 6,066,829 A | 5/2000 | Ishikawa |
| 6,107,600 A | 8/2000 | Kurosawa et al. |
| 6,121,067 A | 9/2000 | Canella |
| 6,121,574 A | 9/2000 | Xu |
| 6,160,835 A | 12/2000 | Kwon |
| 6,351,324 B1 | 2/2002 | Flint et al. |
| 6,424,430 B1 | 7/2002 | Bilodeau et al. |
| 6,433,303 B1 | 8/2002 | Liu et al. |
| 6,518,540 B1 | 2/2003 | Wee et al. |
| 6,676,878 B2 | 1/2004 | O'Brien et al. |
| 6,681,055 B1 | 1/2004 | Sato |
| 6,697,408 B2 | 2/2004 | Kennedy et al. |
| 6,734,392 B2 | 5/2004 | Philipp et al. |
| 6,791,592 B2 * | 9/2004 | Assa et al. ................... 347/225 |
| 6,826,204 B2 | 11/2004 | Kennedy et al. |
| 6,888,095 B2 | 5/2005 | Khan |
| 2003/0011672 A1 | 1/2003 | Emge et al. |

| | | | | | | |
|---|---|---|---|---|---|---|
| 2005/0152146 | A1 * | 7/2005 | Owen et al. ............... 362/294 | JP | 2187289 | 7/1990 |
| | | | | JP | 2217186 | 8/1990 |
| | | | | JP | 376677 | 4/1991 |
| | | | | JP | 5169286 | 7/1993 |
| | | | | JP | 2005-7471 | 1/2005 |
| | | | | JP | 2005007471 A * | 1/2005 |

FOREIGN PATENT DOCUMENTS

| | | | |
|---|---|---|---|
| DE | 243 798 A1 | 11/1987 |
| EP | 0 141 724 B1 | 5/1985 |
| EP | 0 168 351 A1 | 1/1986 |
| EP | 0 168 351 B1 | 1/1986 |
| EP | 0 176 872 A1 | 4/1986 |
| EP | 0 215 389 B1 | 3/1987 |
| EP | 0 233 146 A1 | 8/1987 |
| EP | 0 233 146 B1 | 8/1987 |
| EP | 0 244 574 A1 | 11/1987 |
| EP | 0 262 225 A1 | 4/1988 |
| EP | 0 276 995 B1 | 8/1988 |
| EP | 0 316 347 B1 | 5/1989 |
| EP | 0 391 539 A2 | 10/1990 |
| EP | 0 391 540 A2 | 10/1990 |
| EP | 0 400 476 A2 | 12/1990 |
| EP | 0 419 377 A1 | 3/1991 |
| EP | 0 420 198 B1 | 4/1991 |
| EP | 0 446 482 A1 | 9/1991 |
| EP | 0 446 887 A1 | 9/1991 |
| EP | 0 453 733 A1 | 10/1991 |
| EP | 0 464 270 A1 | 1/1992 |
| EP | 0 495 647 B1 | 7/1992 |
| EP | 0 516 199 A1 | 12/1992 |
| EP | 0 519 391 A1 | 12/1992 |
| EP | 0 531 565 A1 | 3/1993 |
| EP | 0 531 584 A1 | 3/1993 |
| EP | 0 402 298 B1 | 7/1993 |
| EP | 0 729 806 A1 | 9/1996 |
| EP | 0 729 906 B1 | 6/2000 |
| ES | 2 013 193 | 4/1990 |
| FR | 2 271 683 | 12/1975 |
| FR | 2 450 455 | 9/1980 |
| GB | 1 360 380 | 7/1974 |
| GB | 1 450 251 | 9/1976 |
| GB | 1 467 152 | 3/1977 |
| GB | 1 541 214 | 2/1979 |
| GB | 2 059 354 A | 4/1981 |
| GB | 2 073 639 A | 10/1981 |
| GB | 2 078 621 A | 1/1982 |
| GB | 2 126 955 A | 4/1984 |
| GB | 2 131 417 A | 6/1984 |
| GB | 2 133 180 A | 7/1984 |
| GB | 2 133 352 A | 7/1984 |
| GB | 2 157 851 A | 10/1985 |
| GB | 2 169 282 A | 7/1986 |
| GB | 2 202 647 A | 9/1988 |
| GB | 2 229 389 A | 9/1990 |
| GB | 2 247 677 A | 3/1992 |
| GB | 2 252 068 A | 7/1992 |
| GB | 2 253 282 A | 9/1992 |
| GB | 2291719 | 1/1996 |
| JP | 5229740 | 3/1977 |
| JP | 5511824 | 1/1980 |
| JP | 5714981 | 1/1982 |
| JP | 5781984 | 5/1982 |
| JP | 5796865 | 6/1982 |
| JP | 5942194 | 3/1984 |
| JP | 5945091 | 3/1984 |
| JP | 5973191 | 5/1984 |
| JP | 59207246 | 11/1984 |
| JP | 60106686 | 6/1985 |
| JP | 60227994 | 11/1985 |
| JP | 63248589 | 10/1988 |
| JP | 63174314 | 11/1988 |
| JP | 2863872 | 12/1988 |
| JP | 6411083 | 1/1989 |
| JP | 1166893 | 6/1989 |
| JP | 215887 | 1/1990 |
| JP | 2187288 | 7/1990 |
| WO | WO 81/01889 | 7/1981 |
| WO | WO 82/00635 | 3/1982 |
| WO | WO 85/00123 | 1/1985 |
| WO | WO 86/04549 | 8/1986 |
| WO | WO 89/01385 | 2/1989 |
| WO | WO 90/00459 | 1/1990 |
| WO | WO 90/04223 | 4/1990 |
| WO | WO 91/04828 | 4/1991 |
| WO | WO 91/12923 | 5/1991 |
| WO | WO 92/04155 | 3/1992 |
| WO | WO 92/09399 | 6/1992 |
| WO | WO 92/12820 | 8/1992 |
| WO | WO 93/15029 | 8/1993 |
| WO | WO02/12411 | 2/2002 |

OTHER PUBLICATIONS

Dambrot, S. "Applications Drive Japan's Laser Industry", *Photonics*, Jul. 1992.
Inglesby, T. "Printers on the Floor and in the Bars", *Manufacturing Systems*, Feb. 1992.
Kirkland, C. "Hydraulic Pumps: Fixed vs. Variable Volume", *Plastics World*, Oct. 1991.
LaCosse, D. "Manufacturing Begins With Product Marking", *Automation*, Sep. 1988.
Lang, N. "Packaging Parade", *Beverage World*, Jan. 1991.
Makadok, S. "Production Realities: Faster, Smarter a Must", *Beverage Industry*, vol. 83, No. 12, Dec. 1992.
Mark, "Lasers Help Capacitor Maker Gain Good Marks", *Production Engineering*, Jul. 1983.
Mikami, T. et al. "A Correction Method for Laser Scanning Errors in High Speed Laser Printers", *Fujitsu*, vol. 18, No. 4, 1982.
Redmond, B. "Demand Calls the Tune", *Materials Handling News*, Jul. 1985.
Samuels, M. "PLC and PC Join to Automate Laser Assembly", *Production Engineering*, Mar. 1987.
Seideman, T. "BC Labels Turn High-Tech", http://web4.infotrac.galegroup.com, vol. 92, No. 1, p. 83(2), Jan. 1993.
Spencer, J. "Labeling & Marking", *Handling and Shipping Management*, Jan. 1983.
Stovicek, D. "No Longer Science Fiction, Lasers are Now a Part of Every Day Life in Industry", *Automation*, Aug. 1989.
"What's Ahead in Marking and Labeling", *Modern Materials Handling*, Oct. 1985.
"ProLase for Window's 95 Features", http://laserware.com/95Features.html, retrieved Oct. 6, 2000.
"CLC ControlLaser Corporation", printout Mar. 6, 2000.
"Industrial Dynamics Offers the Lasetec Laser Printer for High Quality Product Information and Codes at High Speeds on Bottles, Cans, Packages", http://www.filtec.com/newpage1.htm, 1999-2000, retrieved Oct. 6, 2000.
"Overview of WinLaseNT™ Marker Suite", http://www.alase.com/software/software.html, retrieved Oct. 6, 2000.
"SCAN jet", http://www.scanlab.de/jetmain.html, retrieved Oct. 6, 2000.
"SCANjet—more information", http://www.scanlab.de/jetmain2.html, retrieved Oct. 6, 2000.
"LaserPro DM Laser Coding System", http://www.marconidata.com/products/prod_laserpro_dm.html, 1997-2000, retrieved Oct. 7, 2000.
"Videojet Announces New Position in Laser Coding Market", Press Release, http://www.marconidata.com/press/laser_pr.html, 1997-1999, retrieved Oct. 7, 2000.
MIKOH Corporation Limited, http://www.mikoh.com/index.html, retrieved Oct. 6, 2000.

"Beam-Steered Laser Marking on Parts in Motion", http://www.semiconductorfabtech.com/features/tap_old/articles/06.427.html, retrieved Oct. 6, 2000.

"Laser Systems—Medical Device Manufacturing", http://www.gsilumonics.com/markets%5Fframe/medical/marking.htm, GSI Lumonics 2000, retrieved Oct. 6, 2000.

Front Range Laser, http://www.frontrangelaser.net/products.htm, Jun. 9, 2000, retrieved Oct. 7, 2000.

Laser Technology Centre company description, http://www.hi-laser.com/eng/about/about.htm, 2000, retrieved Oct. 7, 2000.

BetaMark-2000 product description, http://www.hi-laser.com/eng/equipment/betamark2000.htm, retrieved Oct. 7, 2000.

Solaris Laser S.A., http://www.solarislaser.com.pl/index.htm, retrieved Oct. 7, 2000.

"Coming soon! The FH-Series "Tracker" Marking Head", http://www.winmarkpro.com/PressReleases/Tracker.htm, Mar. 2000, retrieved Oct. 6, 2000.

"FH-Series Marking Head", http://www.winmarkpro.com/Products/marking.htm, retrieved Oct. 6, 2000.

FH Series Marking Head, Marking Specifications, http://www.winmarkpro.com/Products/FHSpecs.html, retrieved Oct. 6, 2000.

"SolarJet: Laser Marking 'On the Fly' System for High Speed Package Coding", http://www.wlsc.com/solarjet.htm, retrieved Oct. 7, 2000.

Industrial Laser Source, "Software for High Speed Galvonometer/Scanner for Marking or Cutting on the Fly", http://www.lasertubes.com/software.htm, retrieved Oct. 7, 2000.

* cited by examiner

PULSED LASER PRINTING

BACKGROUND

The present application describes systems and techniques relating to laser printing systems, for example, laser-based systems for printing codes on products.

Laser printing systems have been used to mark various types of surfaces. For example, laser printing has been used to mark codes on commercially available products. Such codes often include information corresponding to the time and place of product manufacture (e.g., a batch number). Typical types of codes marked on products include alphanumeric codes and machine readable codes. When products are marked as part of a manufacturing or packaging process, increasing the speed of marking and decreasing the costs of the printing system facilitate optimization of the manufacturing or packaging process.

SUMMARY

The present disclosure includes systems and techniques relating to pulsed laser printing. According to an aspect, an apparatus includes a laser operable to produce a pulsed printing beam; an optics assembly operable to focus and direct the pulsed printing beam; and electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol. The electronics can be operable to deliver the power pulses and initiate the moves between the predefined locations at a common frequency during formation of the symbol, and the common frequency can be a programmable control variable of the electronics.

The electronics can be operable to deliver the power pulses in synchronization with arrival at the predefined locations. The electronics can be configured to receive feedback in a closed loop, the feedback indicating arrival at the predefined locations, and use the feedback to control timing of power pulse delivery. Furthermore, the electronics can be configured to base the timing of power pulse delivery at least in part on a recovery period of the laser and initiate the moves of the pulsed printing beam from the predefined locations during delivery of pulse-tail portions of the pulsed printing beam.

The electronics can be configured to receive sensed power delivery to the predefined locations to control initiation of the moves between the predefined locations. The electronics can include a mirror position sensor and a laser emission sensor. Moreover, the electronics can include a laser controller operable to overdrive the laser and generate a superpulse beam.

The apparatus can include a continuously variable power supply operable to power the laser, and the electronics can be operable to control the continuously variable power supply to adjust a power output level of the laser. The laser controller can be operable to overdrive the laser at a frequency above 1 kilohertz, and the power pulses can have rise and fall times less than 50 microseconds. The laser can be an air cooled laser, and an average of power fluence during pulse delivery on the predefined locations can be greater than an average power of the laser when operated in a continuous wave mode. In addition, the laser controller can provide two modes of operation, a superpulse mode and a continuous wave mode, and the electronics can select a mode of operation based on a density of the predefined locations.

According to another aspect, a system includes a conveyor on which a product travels; a laser operable to produce a pulsed printing beam; an optics assembly operable to focus and direct the pulsed printing beam; and electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol, wherein the electronic overdrive the laser to generate a superpulse beam, and the electronics deliver the power pulses in synchronization with arrival at the predefined locations.

According to another aspect, a technique includes directing a pulsed printing beam through a series of moves that steer the pulsed printing beam in a non-raster scanning pattern to predefined locations on a material to mark spots on the material at the predefined locations, the spots being arranged to form a symbol; and superpulsing a laser to produce power pulses of the pulsed printing beam in synchronization with the moves, such that delivery of the power pulses is synchronized with arrival at the predefined locations.

Feedback indicating arrival at the predefined locations can be received in a closed loop, and the feedback can be used to control timing of power pulse delivery. Sensed power delivery to the predefined locations can be received and used to control initiation of the moves between the predefined locations. A peak power of the pulsed printing beam can be adjusted using a continuously variable power supply. Moreover, selection between superpulse and continuous wave modes of operation can be made based on a density of the predefined locations.

One or more of the following advantages may be provided. The systems and techniques described may result in reduced operating costs for a laser printing system. A ten Watt laser printing system employing the techniques described may be as effective as a traditional vector-based fifty Watt laser printing system in a commercial laser marking process. The size of the laser printing system may be reduced. Electricity usage may be decreased. Wasted energy may be reduced in spot-marking-based laser printing by decreasing the amount of energy deposited between spots making up the symbol(s) printed. More materials may be marked with a laser of a given power rating than would otherwise be possible. Products may be marked faster in a product line with a laser of a given power rating than would otherwise be possible. Laser cooling requirements may be reduced, and overall efficiency may be improved.

Details of one or more implementations are set forth in the accompanying drawings and the description below. Other features and advantages may be apparent from the description and drawings, and from the claims.

BRIEF DESCRIPTION OF THE DRAWINGS

Like reference symbols in the various drawings indicate like elements.

DETAILED DESCRIPTION

Figure 1:
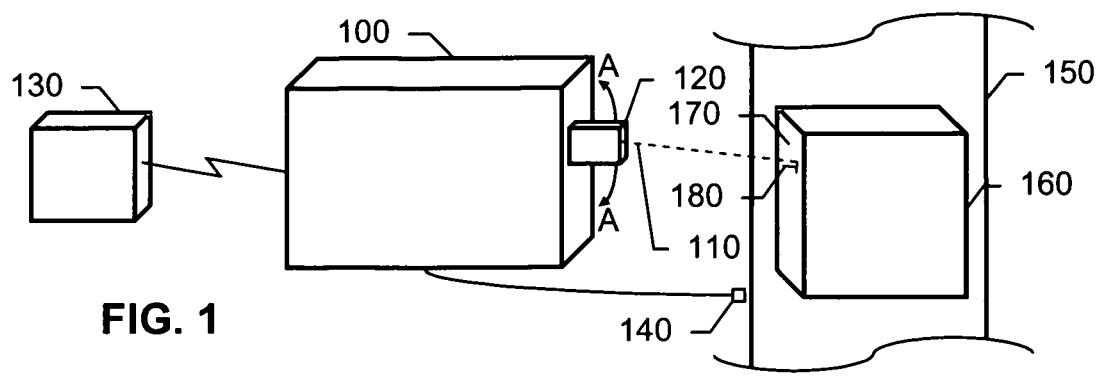
FIG. 1 is a top, perspective view of a laser printing system.

FIG. 1 is a top, perspective view of a laser printing system. The system includes a laser printing device 100 that generates a pulsed printing beam 110, which is continuously directed through a series of moves between predefined locations on a material 170 to mark spots on the material at the predefined locations. The spots are arranged to form a symbol 180 on the material 170, and the power pulses of the pulsed laser beam are synchronized with the moves. Details of this synchronization of power pulses with spot placement are described below in connection with FIGS. 6-8.

The diameter of a spot can vary depending on the implementation, but often falls between 100 μm and 400 μm. The symbol 180 can be a human-readable symbol (e.g., an alphanumeric character, such as the "T" shown), a machine-readable symbol (e.g., a one dimensional or two dimensional bar code), various other symbols (e.g., a symbolic image, such as a company logo or trademark), or combinations of these. The material 170 can be part of a product 160 moving on a conveyor 150, which can be part of a manufacturing or packaging process.

A spot is formed on the product by altering a visible, optical characteristic of the material 170 at the location where the pulsed printing beam is incident on the material such that a mark is formed that is visible to the naked human eye. The pulsed printing beam can alter a variety of optical characteristics. For instance, the pulsed printing beam can cause one or more layers of material to be ablated so the underlying layers are visible. Because upper layers of a material used in packaging a product often have an ink layer on paper, removal of the ink layer leaves a spot where the paper is visible against the surrounding ink layer. This can also be done when the ink layer resides below one or more additional layers, such as a wax layer over the ink layer. The refractive characteristics of a material can also be altered. For instance, the pulsed printing beam can be used to print information on a plastic material, such as a soft drink bottle. The pulsed printing beam alters the refractive characteristics of the plastic. The printed information is easily visible since the human eye can pick up the sections having contrasting refractive properties. Additionally, the pulsed printing beam can etch certain materials.

The predefined locations can be arranged such that the spots form multiple symbols. The predefined locations can be arranged such that the spots form multiple pixels, and the pixels in turn form the one or more symbols. Because the printing system employs a laser in order to print on the product, there is no need for consumables such as inks and solvents. Accordingly, the printing system can reduce the costs and complexity associated with printing information on a product.

The products for use with the printing system can be products to be sold retail, products sold to businesses, or packaging of products. Examples of products include pharmaceuticals, pharmaceutical packaging, food packaging, cosmetics, food such as eggs, dairy products, ice cream, computer components, automotive components, medical devices, detergents and beverages such as soft drinks and wines. Moreover, the symbols can be formed in multiple locations on a product and can include both code information and image information.

The system includes electronics that operate the laser printing device 100. These electronics can include analog and digital electronic circuitry, such as one or more application specific integrated circuits (ASICs), as well as programmable electronics, such as one or more programmable processors, and one or more memory devices. These electronics are included in the laser printing device 100, but can also be included in one or more additional devices making up the laser printing system. For example, a device 130 can be communicatively coupled (by wire or wireless link) with the laser printing device 100. The device 130 can be an electronic user interface device designed specifically for the laser printing device 100, a general purpose computer programmed with user interface software, or a combination of these.

The user interface can be remote from the printing device 100, attached to the printing device 100, and/or detachable from the printing device 100. A suitable user interface can include an alphanumeric keyboard and a display. The user interface can be used to program the electronics and/or set printing parameters. For instance, the user interface can be used to control the time that the pulsed printing beam 110 stays at a location on the material 170 to form a spot, the size of any pixels used to form a symbol, and the type and sequence of symbols that are formed. The user interface can also be used to manually activate the printing system. For instance, the user interface can include a print key that causes the laser printing device 100 to print on the material 170.

The laser printing system can be used to print symbols on products that are moving, where there is a limited amount of time available for printing on each product. The laser printing system can include electronics for varying the amount of time required to print the symbols on the product. For example, the laser printing system can include electronics for changing the density of pixels in the symbol(s) to be formed, such as by changing the density of individual pixels that define an alphanumeric code or changing the number of pixels making up an image. Symbols having a reduced pixel density can be printed more quickly than symbols with an increased pixel density. Furthermore, the printing system can include electronics for changing the size of the pixels. Smaller pixels require less printing time. The ability to change the time required to print a symbol allows the printing system to be used in conjunction with an increased number of production lines.

The electronics that operate the laser printing device 100 can also be in communication with one or more sensors 140. These sensors can provide the electronics with information about the products on which the printing system is to print. For instance, the sensors 140 can indicate the location of a product relative to the printing system, the direction that a product is moving and when a moving product has been stopped and when a product is in the correct position to be printed upon. Suitable sensors 140 include, but are not limited to, a speed sensor for detecting the speed and/or direction that a product is moving, and a location sensor for indicating when a product is positioned in front of the sensor.

The laser printing system can operate as part of a product line and can print on a moving product or a stationary product. A product line can temporarily stop the product 160 in front of the laser printing device 100. A sensor 140 can be a device that triggers the printing (e.g., a device that produces a light beam, which is disrupted by the product) either immediately or after a time delay. When the printing system operates on a moving product, the electronics can use signals from a speed sensor 140 to determine the speed and direction of the product 160 on the product line. Suitable speed sensors include, but are not limited to, encoders and resolvers. The printing system can determine the speed of the product 160 on the line and use this speed to determine a symbol position time delay. The symbol position time delay is determined such that the symbol is printed at a desired position on the product 160. The symbols are then printed as the product 160 moves past the printing device 100 based on the determined symbol position time delay. Additionally, the printing system can determine the speed of a next product while printing on a current product.

When setting up the laser printing system, the distance between the laser printing device 100 and the product 160 and/or the sensor 140 can be administratively entered into the electronics with the user interface. Alternatively, the sensor 140 can be attached to the laser printing device 100 so as to provide a fixed and known distance between the sensor 140 and the pulsed printing beam 110. In this latter embodiment, the distance is known to the electronics in the system and does not need to be administratively entered.

The laser printing device 100 can include a printing beam exit member 120 through which the pulsed printing beam 110 exits a housing of the printing device 100. The printing beam exit member 120 can be an opening in the housing or an immobile window mounted in the housing. In another embodiment, the printing beam exit member 120 can be moved relative to the housing as illustrated by the arrows labeled A. In this embodiment, the printing beam exit member 120 can be rotatably moved (e.g., manually adjusted) through a continuous set of multiple directional positions to point the pulsed printing beam 110 toward a particular position on the material 170, thus allowing the pulsed printing beam 110 to be readily aimed, after the device 100 has been installed, by manipulating the printing beam exit member 120.

The laser printing device 100 can include components for defining a print zone on the material 170. For example, a rectangle can be projected onto the material 170, where the one or more symbols will be formed within the print zone. During operation of the laser printing system, the print zone can be formed on the material 170; an operator can adjust the beam exit member 120 so that the print zone appears at the desired location on the material 170. A user interface can then be used to activate printing within the print zone. Thus, the operator of the printing system can select where the printing beam prints on the material 160 by ensuring that the print zone appears in the desired print location. Other suitable print zone marks include, but are not limited to, marks at the four corners of a print zone, a mark positioned in the center of the print zone, and a dashed line around the print zone.

Additionally, the electronics of the laser printing system can be designed to control the size and geometry of the print zone. As a result, the electronics can match the size and shape of the symbols to be printed on the material 170. For example, when an unusually large code is to be printed on the material 170, the electronics can enlarge the print zone so the code will be formed entirely within the print zone. As a result, an increase in the size of the code will not result in erroneous positioning of the code on the material 170.

Figure 2:
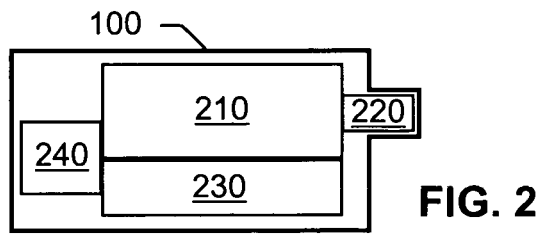
FIG. 2 is a block diagram illustrating components of a laser printing device.

FIG. 2 is a block diagram illustrating components of the laser printing device 100. A laser 210 produces the pulsed printing beam. For example, the laser 210 can be operated in a superpulse mode. By using superpulse, a higher peak power output can be obtained than the average power output of the laser when run in a normal operational mode. Various different types of lasers can be used, and in particular, a lower power laser can be used (lower power relative to what would normally be needed to mark the material) due to the effective increase in delivered power created by the systems and techniques described here. For example, the laser 210 can be a $CO_2$ air cooled laser. In various embodiments, the laser can be a 30 Watt laser, a 20 Watt laser, a 10 Watt laser or a 5 Watt laser. When the laser is a low power laser, the components of the laser printing device 100 can be mounted in a housing having a size on the order of an ink jet printer (e.g., a volume of less than 1500 cubic inches).

To make the laser 210 operable in a superpulse mode, more gas may be used than would be the case for a similar laser that only operates in a continuous wave mode, and the gas percentages can be adjusted as needed, based on the superpulse frequencies to be obtained. In addition, more advanced dirver (s) can also contribute to making the laser 210 operable in a superpulse mode. In general, there is a balance to be found, which is dependent on the internal laser geometry. Thus, the laser 210 can be made to operate in a superpulse mode by adjusting gas percentages and density, driver component(s) and laser geometry.

The pulsed printing beam passes through an optics assembly 220, which steers the pulsed printing beam from one location to another location on the material. The optics assembly 220 includes components for altering the direction of the pulsed printing beam. These components can be controlled to steer the pulsed printing beam from one location to another location in an non-raster scanning pattern (i.e., a scanning pattern other than one of parallel lines) so as to create a spot at each of the locations.

Electronics 230 are in communication with the laser 210 and the optics assembly 220. The electronics 230 can control the operation of the laser 210 and the optics assembly 220. The electronics 230 can control the optics assembly 220 to adjust the direction of the pulsed printing beam, the length of time that the pulsed printing beam remains at a location on the material where a spot is to be formed, the speed that the pulsed printing beam moves between locations where the beam dwells, the size of pixels used to create symbols, and the selection of symbols created. Moreover, the electronics 230 control the laser 210 to generate the power pulses of the pulsed printing beam in synchronization with the moves of the pulsed printing beam between locations where the beam dwells. The dwell time used and the power profile of the pulsed printing beam generated can be adjusted based in part on the nature of the material to be marked.

The laser printing device 100 can include a continuously variable power supply 240. The electronics 230 can control the continuously variable power supply to adjust a power output level of the laser. For example, the power supply 240, which powers the laser 210, can be run from between 30 and 50 Watts. The laser 210 can be run in a continuous wave (CW) mode at about 32 Watts, and the laser 210 can be run in a superpulse mode at about 48 Watts. Moreover, the superpulse peak power can be adjusted, at least in part, by controlling the variable power supply. The pulse width can also be adjusted, and both pulse width and power supply can be adjusted in order to tune the power and the fluence with the moves.

Figure 3:
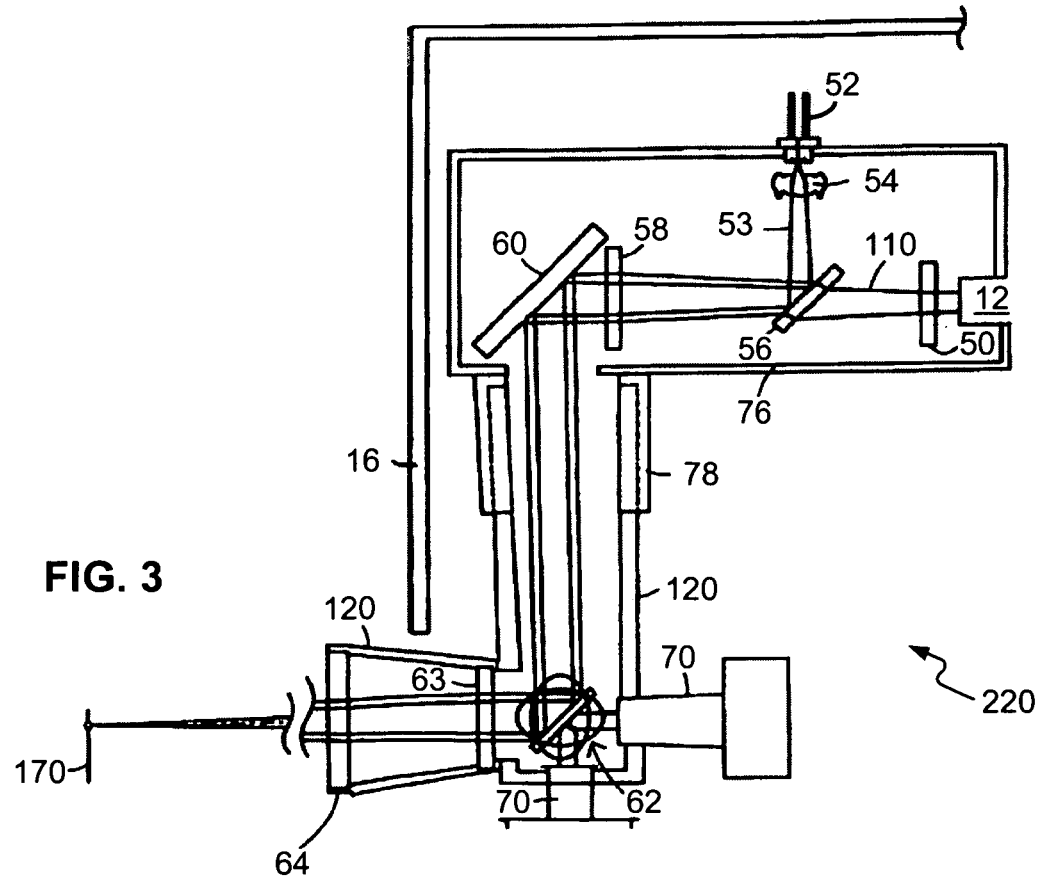
FIG. 3 illustrates example components of an optics assembly.

FIG. 3 illustrates example components of the optics assembly 220 in relation to a housing 16 of the laser printing device 100. The optics assembly 220 includes a laser source 12 that provides the pulsed printing beam 110. The beam 110 passes through a first negative lens 50, which expands the printing beam 110. The optics assembly 220 also includes a print zone light source 52 for producing a print zone beam 53. The print zone beam 53 passes through a second negative lens 54, which expands the print zone beam.

Although the printing beam 110 and the print zone beam 53 are illustrated as being concurrently produced, the electronics can cause them to be produced independent of one another (e.g., the print zone beam 53 can be activated whenever the printing beam 110 is deactivated and visa versa). Further, the print zone beam 53 is optional and need not be included in the optics assembly 220. The printing beam 110 and the print zone beam 53 are combined at a beam combiner 56. The combined beams pass through a positive lens 58, which collimates the beams before they are turned at a reflector 60. The combined beams then pass to a plurality of mirrors 62, which reflect the combined beams toward a second positive lens 63, which focuses the combined beams. The combined beams then pass through a protective window 64 before passing to the material 170.

The mirrors 62 can be two mirrors arranged such that the first mirror reflects the beam 110 onto the second mirror (in a direction parallel with a line coming out of the page), and the second mirror reflects the beam 110 toward the second positive lens 63. One or more of the mirrors 62 can be coupled with one or more actuators 70 that move the mirror(s) 62. Suitable actuators 70 include, but are not limited to, micromotors. The actuators 70 are controlled by the electronics. The electronics can use the actuators 70 to steer the printing beam 110 to form the symbol(s) on the material 170, and the electronics can use the actuators 70 to steer the print zone beam 53 to produce the print zone (e.g., the print zone beam 53 can be steered to trace a rectangle around the print zone at a speed which causes the rectangle to appear solid to the human eye or at about 100 cycles/second).

As discussed above, the laser printing system can include a printing beam exit member 120 that can be moved relative to a device housing 16. A frame 76 supports the printing beam exit member 120 within the housing 16. A bearing 78 positioned between the frame 76 and the printing beam exit member 120 allows the printing beam exit member 120 to move relative to the frame 76 (i.e., the exit member 120 rotates into and out of the page). The printing beam 110 passes through the bearing 78 along the axis of rotation permitted by the bearing 78. Hence, movement of the printing beam exit member 120 relative to the frame 76 does not change the position of the printing beam 110 relative to the bearing 78.

The mirrors 62 and the actuators 70 are coupled with the printing beam exit member 120. As a result, the mirrors 62 and the actuators 70 move with the printing beam exit member 120 as the printing beam exit member 120 is moved relative to the housing 16. Further, a portion of a first of the mirrors 62 is positioned along the bearing's axis of rotation. Hence, movement of the printing beam exit member 120 does not alter the angle of incidence between the printing beam 110 and the first mirror. Accordingly, the first mirror directs the printing beam 110 toward the same portion of the second mirror and the printing beam 110 exits the housing 16 through the same portion of the window when the printing beam exit member 120 is moved relative to the housing 16.

For additional details regarding the optics assembly 220 and techniques for laser printing on a moving product, see U.S. Pat. No. 6,791,592, issued Sep. 14, 2004, and entitled "Printing A Code on a Product", which is hereby incorporated by reference. Various other optics assemblies can also be used. See for example, U.S. patent application Ser. No. 10/693,356, filed Oct. 24, 2003, and entitled "Low Angle Optics and Reversed Optics", which is hereby incorporated by reference.

Figure 4:
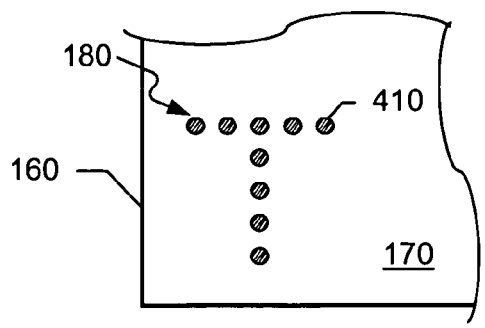
FIG. 4 illustrates an example symbol formed on a material of a product.

FIG. 4 illustrates an example symbol 180 formed on a material 170 of a product 160. The symbol 180 is formed of a set of pixels 410, and the density of pixels 410 (i.e., the number of pixels forming a symbol of a given size) can be adjusted as needed, even to the point where the pixels overlap each other. Each pixel 410 can be a single spot or multiple spots created by the pulsed laser beam. For example, each pixel 410 can be three spots grouped together into a roughly triangular pixel. Some pixels 410 can have a different size than other pixels 410. Different shapes for pixels made up of multiple spots are possible as well, such as square, hexagonal, or circular pixels.

Figure 5:
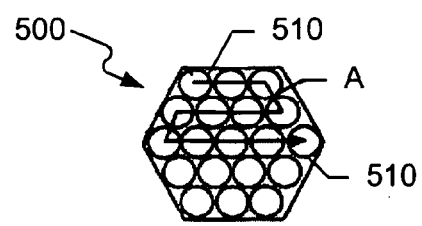
FIG. 5 illustrates multiple spots arranged so as to define a hexagonal pixel.

Moreover, in some implementations, an operator of the printing system can use the user interface to select the size and shape of the pixels. FIG. 5 illustrates multiple spots 510 arranged so as to define a hexagonal pixel 500. Moving the printing beam from one location to another location, as illustrated by the arrow labeled A, creates the pixel 500 by creating a spot 510 at each location.

The time required to form a spot is generally a function of the components of the material. For instance, the material may have an ink layer and an overlying layer (e.g., a wax layer that protects the packaging and gives it an attractive appearance), and the time needed to ablate the wax layer and the ink layer can be about 35 microseconds to 1 millisecond using the air cooled lasers described herein.

The distance between the spots and/or pixels can be adjusted to increase or decrease the size and/or density of the symbol. In some instances, the distance between the pixels is reduced to the point that the perimeter of one pixel abuts the perimeter of another pixel. When the pixel perimeters abut one another, a code and/or an image being printed can have a solid and continuous appearance.

The size of the pixels formed by the printing system can be adjusted by increasing the number of spots used to create the pixel and/or by decreasing the density of spots while keeping the number of spots the same. When faster printing is needed, the total number of spots used to make up the symbol can be decreased, such as by decreasing the density of spots used to make up a symbol of a given size. This adjustment capability can also be made available to the operator of the of the printing system through the user interface. Moreover, the printing system electronics can be configured to select a mode of operation (CW or superpulse) based on a density of the spots in the code.

The electronics can include components that facilitate input of symbols. The electronics can include a database that associates alpha-numeric symbols with particular pixel patterns. As a result, the operator can enter a symbol or symbol sequence into the user interface, and the printing system consults the database to determine the pixel pattern associated with each symbol. The electronics can also include an input interface for bar code information and image information. For example, a software application can be used to enter two dimensional bar code information, which can be converted into a set of character information in a font specified for 2D bar code printing. Such character information can be communicated to the laser printing device, which can include electronics that recognize the font and can thus convert the character information into the pixel pattern (e.g., each "character" in the recognized font can correspond to a vertical set of elements in the 2D bar code). The software application can also be used to enter a graphic image, which can be converted into the pixel pattern for printing, by filling dark areas of the image to be marked with concentric outlines of pixels (e.g., single spot pixels), starting at the perimeter and moving in to the center of the image until all dark areas are filled.

The electronics can use the pixel pattern of each symbol to form a first data set which indicates the position of each pixel. For instance, each pixel can be associated with a Cartesian coordinate, which indicates where the pixels are to be printed relative to one another. Other coordinate systems and methods can also be used to control the relative positioning of the pixels in a symbol.

Figure 6:
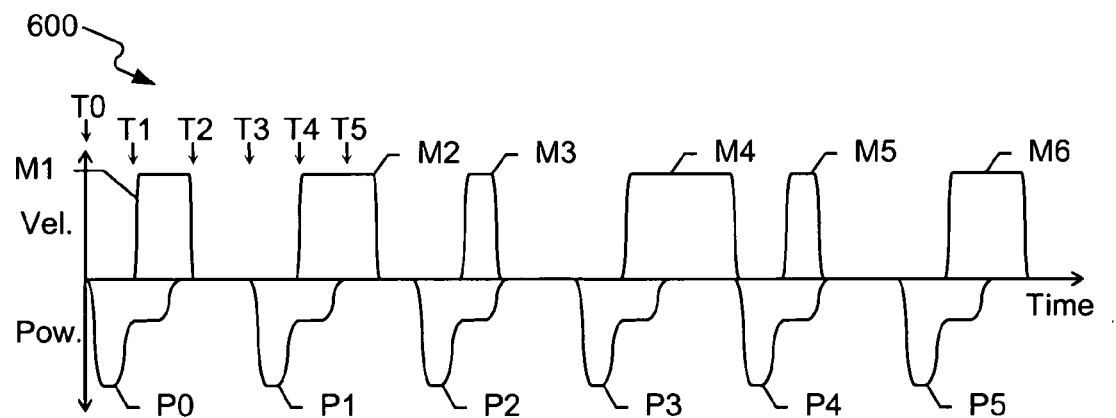
FIGS. 6 and 7 illustrates synchronization of power pulses with moves between predefined locations to mark spots on a material.

FIG. 6 illustrates synchronization of power pulses with moves between predefined locations to mark spots on a material. The predefined locations correspond to where the spots are to be placed and can be specified according to a corrected data set for a moving product. A graph 600 shows moves, M1-M6, and power pulses, P0-P5. The x axis of the graph 600 indicates time, the upper half of the y axis indicates the velocity of the pulsed printing beam across the material, and the lower half of the y axis indicates the power level of the pulsed printing beam (moving downward in the lower half of the graph 600 indicates increasing power). A move between the predefined locations can be accomplished by moving one or more mirrors 62 in the optics assembly 220. This can involve rapidly accelerating to the top speed (at time T1 for move M1), cruising at that top speed, and then rapidly decelerating to a stop at the next predefined location (at time T2 for move M1), as illustrated in FIG. 6.

The power pulses, P0-P5, of the pulsed printing beam can have a power distribution as illustrated and can be delivered at a common frequency with initiation of the moves, M1-M6, between the predefined locations. Delivery of the power pulses can be represented by the initiation of the power pulses, and thus the time between T0 and T3 (the time between initiation of pulse P0 and pulse P1) will be generally equal to the time between T1 and T4 (the time between initiation of move M1 and move M2). Additionally, the pulsed printing beam can be held on the predefined locations during delivery of pulse-peak portions of the pulsed printing beam, and moves of the pulsed printing beam can be initiated during delivery of pulse-tail portions of the pulsed printing beam, as shown. Thus, move M1 begins at time T1 during delivery of the pulse-tail portion of pulse P0, move M2 begins at time T4 during delivery of the pulse-tail portion of the pulse P1, and the pulse-tail portion of P1 ends during move M2 at time T5. Moreover, a move may be so short as to occur entirely within the pulse-tail portion, as illustrated by moves M3 and M5. The reduced power of the beam during this pulse-tail, and the speed with which the beam moves over the material results in no visible marking during these moves.

The common frequency of the moves and the pulses can be determined according to a maximum time needed for a move. This maximum time can be preset based on the capabilities of the laser printing system (e.g., based on the time need to make a largest possible move available with a given optical assembly design), or this maximum time can be set on the fly based on the capabilities of the laser printing system and the symbol(s) to be printed (e.g., based on a maximum move time needed for a given corrected data set). In the graph 600, the move M4 is a maximum move, and the pulse P4 is initiated when the pulsed printing beam begins its deceleration.

The common frequency of the moves and the pulses can also be determined according to how fast the laser can be pulsed, which depends on the laser and driver design, including a recovery period of the pulsed laser (e.g., a gas recovery time of a superpulsed laser). The upper limit on pulse speed for the laser generally sets the upper limit on the common frequency. Using the pulse speed to set the common frequency can be in addition to using the maximum move time, or the pulse speed alone can be used in some implementations. For example, in some instances, all moves are so fast that the common frequency is set according the maximum pulsing frequency available in light of a given material to be marked.

The synchronization of power pulses with moves illustrated in FIG. 6 can be implemented in an open-loop control system. When delivery of the power pulses and initiation of the moves are both controlled using a common frequency, the electronics need not include sensor feedback to confirm arrival at the next predefined location before making the spot. Arrival at the next predefined location within the allotted time can be assumed given a properly set common frequency. In some implementations, the moves can take times between 5 microseconds and 1 millisecond, depending on the driver(s), power supply and distance moved. The dwell time at each location (e.g., time T3 to time T4) can be between 20 and 100 microseconds, and the energy delivered during the dwell time can be between 0.05 and 2 Joules.

Figure 7:
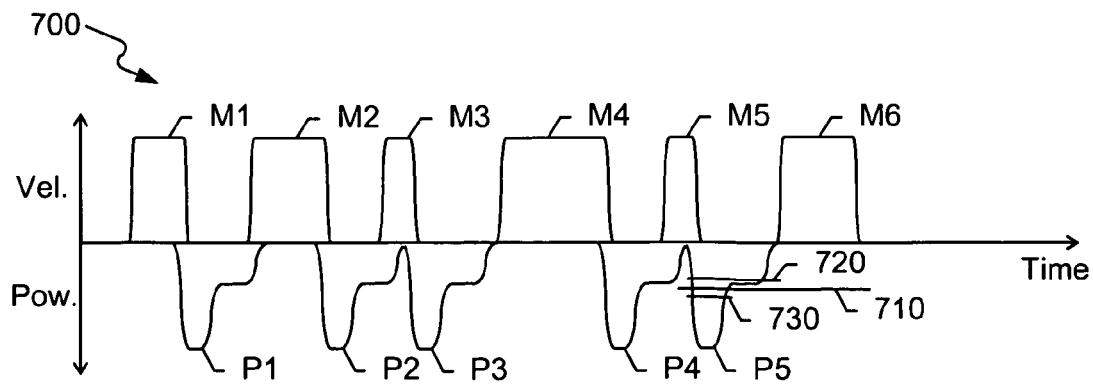

FIG. 7 also illustrates synchronization of power pulses with moves between predefined locations to mark spots on a material. A graph 700 shows moves, M1-M6, and power pulses, P1-P5, with the same axes as in the graph 600. In this case, the timing of delivery of the power pulses is based on the timing of arrival of the pulsed printing beam at the predefined locations. For example, the timing can be such that the power pulse reaches 70-80% of it peak power at the same time that the mirrors are 95-100% settled at the next location for spot placement. Additionally, the timing of delivery of the power pulses can be further based on a recovery period of the pulsed laser when this recovery period exceeds the time needed for the current move. However, in some implementations, the power pulse need not reach zero before the next pulse begins.

As before, the pulsed printing beam can be held on the predefined locations during delivery of pulse-peak portions of the pulsed printing beam, and moves of the pulsed printing beam can be initiated during delivery of pulse-tail portions of the pulsed printing beam. The pulse-peak portions of the pulsed laser beam deliver greater power in a short amount of time than possible for the same laser operated in a continuous wave mode. A line 710 indicates the power output of the laser when operated in a continuous wave mode; a line 720 indicates the average power output of the same laser operated in a pulsed mode; and a line 730 indicates the average power output, during formation of the spot, of the same laser operated in the pulsed mode. Thus, a laser with a given power rating can have a greater effective power when power pulses of the laser are synchronized with the spot-mark placement as described. For example, spots on a given material can be formed more rapidly, and spots can be efficiently formed on materials that are less susceptible to laser ablation, than would be possible with the same laser operated in a continuous wave mode.

Additionally, the moves can be at times much closer together than illustrated. For example, the printing beam may in fact never fully stop, but rather slow down over the predefined location, at which point the laser pulse is delivered. Thus, the dwell time during which a power pulse forms a spot may be a time of relatively slow laser movement as opposed to a full stop of the laser over the formed spot.

The synchronization of power pulses with moves illustrated in FIG. 7 can be implemented in an open-loop control system or a closed-loop control system. In an open-loop implementation, the electronics of the printing system can determine the time needed for the various moves M1-M6 based on the spot-placement information for a given set of one or more symbols to be printed, and the time between pulses can be set accordingly. In a closed-loop implementation, the electronics can sense the timing of arrival at the predefined locations to control the timing of delivery of the power pulses. Additionally, in a closed-loop implementation, the electronics can sense power delivery to the predefined locations to determine when the spot has been formed due to delivery of enough energy, and to control initiation of the moves between the predefined locations.

Figure 8:
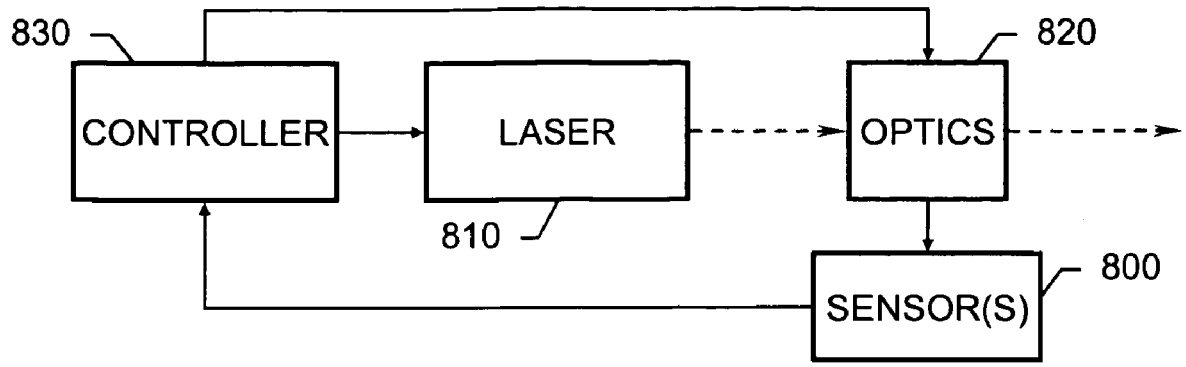
FIG. 8 is a block diagram illustrating components of a laser printing system.

FIG. 8 is a block diagram illustrating components of a laser printing system. This printing system has a closed-loop control system in which one or more sensors 800 provide feedback to a controller 830. The controller 830 overdrives a laser 810 to generate a superpulsed printing beam with pulses occurring at times determined based on the information provided by the sensor(s) 800. A higher source voltage is provided to the laser 810, such that when the laser 810 is turned on, a power spike is produced. The controller 830 can be operable to overdrive the laser 810 at frequencies at or above 1 kilohertz, 5 kilohertz, 7.5 kilohertz, 10 kilohertz or 20 kilohertz. The laser 810 can be an air cooled laser, such as a $CO_2$ laser of 25 Watts or less, 15 Watts or less, or 8 Watts or less.

Additionally, the controller 830 directs optics 820 to move the pulsed laser beam at times determined based on the information provided by the sensor(s) 800. The sensor(s) 800 can be built into the optics 820. The sensor(s) 800 can include a mirror position sensor used to verify arrival of the pulsed printing beam at the predefined locations. The mirror position sensor can employ any of various commercially available sensor technologies, such as resistance, magnetic, or transducer-based sensors. The sensor(s) 800 can also include a laser emission sensor used to identify the end of the pulse-peak portions of the pulsed printing beam. The laser emission sensor can measure various aspects of the laser to determine the emission level, such as by measuring the power in line (e.g. an in-line beam splitter with a germanium sensor), measuring an energy halo created by sending the beam through an aperture, measuring current draw, measuring voltage level, measuring the drive input to the laser, or various other direct or indirect methods of determining where the laser is in the known power profile of the pulses. The controller 830 can initiate the laser pulses based on the information provided by the mirror position sensor and can initiate moves of the pulsed printing beam based on the information provided by the laser emission sensor. Using such sensors allows verification of arrival at the predefined locations and verification that enough energy content above the lazing threshold of the substrate has been deposited to make the spot.

The controller 830 can be part of the electronics described above in connection with FIGS. 1 and 2. FIG. 8 can also illustrate an open-loop implementation by disregarding the sensor(s) 800. Moreover, the controller 830 can provide two modes of laser operation, a superpulse mode and a continuous wave mode, and two modes of synchronization, the common frequency mode and the fire-upon-arrival mode described above.

Figure 9:
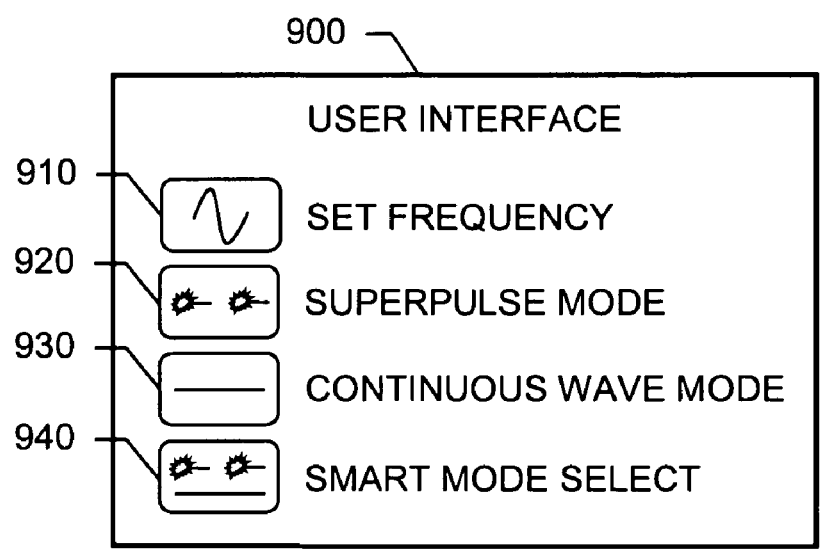
FIG. 9 illustrates an example user interface screen for a laser printing system.

FIG. 9 illustrates an example user interface screen 900 for a laser printing system. The user interface screen 900 includes a set frequency button 910, which can be used to place the system in the common frequency mode of operation. The common frequency can be specified automatically by the system or specified by a system operator through the user interface. Thus, the common frequency can be a programmable control variable of the electronics.

The user interface screen 900 includes a superpulse mode button 920, which can be used to place the system in the superpulse mode of operation. The user interface screen 900 includes a continuous wave mode button 930, which can be used to place the system in the continuous wave mode of operation. Additionally, the user interface screen 900 includes a smart mode select button 940, which can be used to instruct the system to select a mode of operation based on a density of the spots in the one or more symbols to be formed. For example, if the moves between spots are all very short, the system can determine that the continuous wave mode of operation is optimal for the given symbol(s) to be printed on a product, and if the moves between spots are relatively larger, the system can determine that the superpulse mode of operation is optimal for the given symbol(s).

The functional operations described in this specification can be implemented in digital electronic circuitry, or in computer hardware, firmware, software, or in combinations of them, such as the structural means disclosed in this specification and structural equivalents thereof. The described processing operations can be performed by a programmable processor executing a program of instructions to perform functions by operating on input data and generating output. Suitable processors include, by way of example, both general and special purpose microprocessors. Generally, a processor will receive instructions and data from a read-only memory, a random access memory and/or a machine-readable signal (e.g., a digital signal received through a network connection). Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and optical disks, such as CD-ROM disks. Any of the foregoing can be supplemented by, or incorporated in, ASICs.

To provide for interaction with a user, the systems and techniques described can be implemented on a data processing system having a display device such as a monitor or LCD (liquid crystal display) screen for displaying information to the user and a keyboard and a pointing device such as a mouse or a trackball by which the user can provide input to the computer system. The data processing system can be programmed to provide a graphical user interface through which programs interact with users.

Various embodiments have been described above. Other embodiments are within the scope of the following claims. For example, the electronics can include a digital signal processor (DSP) used with the motor driver(s), and instead of a superpulsed laser, a Q-switched laser can be used.

What is claimed is:

1. An apparatus comprising:
  a laser operable to produce a pulsed printing beam;
  an optics assembly operable to focus and direct the pulsed printing beam; and
  electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol;
  wherein the electronics are operable to deliver the power pulses in synchronization with arrival at the predefined locations;
  wherein the electronics are configured to receive feedback in a closed loop, the feedback indicating arrival at the predefined locations, and use the feedback to control timing of power pulse delivery; and
  wherein the electronics are further configured to base the timing of power pulse delivery at least in part on a recovery period of the laser and initiate the moves of the pulsed printing beam from the predefined locations during delivery of pulse-tail portions of the pulsed printing beam.

2. The apparatus of claim 1, further comprising a continuously variable power supply operable to power the laser, and wherein the electronics are operable to control the continuously variable power supply to adjust a power output level of the laser.

3. An apparatus comprising:
a laser operable to produce a pulsed printing beam;
an optics assembly operable to focus and direct the pulsed printing beam; and
electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol;
wherein the electronics are operable to deliver the power pulses in synchronization with arrival at the predefined locations;
wherein the electronics are configured to receive feedback in a closed loop, the feedback indicating arrival at the predefined locations, and use the feedback to control timing of power pulse delivery; and
wherein the electronics are configured to receive sensed power delivery to the predefined locations to control initiation of the moves between the predefined locations.

4. The apparatus of claim 3, wherein the electronics comprise a mirror position sensor and a laser emission sensor.

5. An apparatus comprising:
a laser operable to produce a pulsed printing beam;
an optics assembly operable to focus and direct the pulsed printing beam; and
electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol;
wherein the electronics comprise a laser controller operable to overdrive the laser and generate the pulsed printing beam comprising a superpulse beam;
wherein the laser controller provides two modes of operation, a superpulse mode and a continuous wave mode, and the electronics select a mode of operation based on a density of the predefined locations; and
wherein the laser controller is operable to overdrive the laser at a frequency above 1 kilohertz, and the power pulses have rise and fall times less than 50 microseconds.

6. The apparatus of claim 5, wherein the laser comprises an air cooled laser, and an average of power fluence during pulse delivery on the predefined locations is greater than an average power of the laser when operated in a continuous wave mode.

7. A system comprising:
a conveyor on which a product travels;
a laser operable to produce a pulsed printing beam;
an optics assembly operable to focus and direct the pulsed printing beam; and
electronics communicatively coupled with the laser and the optics assembly, the electronics being operable to control the laser and the optics assembly to generate power pulses of the pulsed printing beam in synchronization with a series of moves that steer the pulsed printing beam in a non-raster scanning pattern to predefined locations on a material to alter an optical characteristic of the material at the predefined locations, which are arranged to form at least a portion of a symbol, wherein the electronic overdrive the laser to generate the pulsed printing beam comprising a superpulse beam, and the electronics deliver the power pulses in synchronization with arrival at the predefined locations;
wherein the electronics are configured to receive sensed power delivery to the predefined locations to control initiation of the moves between the predefined locations.

8. The system of claim 7, wherein the electronics are configured to receive feedback in a closed loop, the feedback indicating arrival at the predefined locations, and use the feedback to control timing of power pulse delivery.

9. The system of claim 7, further comprising a continuously variable power supply operable to power the laser, and wherein the electronics are operable to control the continuously variable power supply to adjust a power output level of the laser.

10. The system of claim 7, wherein the laser controller is operable to overdrive the laser at a frequency above 5 kilohertz, and the power pulses have rise and fall times less than 40 microseconds.

11. The system of claim 7, wherein the laser controller provides two modes of operation, a superpulse mode and a continuous wave mode, and the electronics select a mode of operation based on a density of the predefined locations.

12. A method comprising:
directing a pulsed printing beam through a series of moves that steer the pulsed printing beam in a non-raster scanning pattern to predefined locations on a material to mark spots on the material at the predefined locations, the spots being arranged to form a symbol;
superpulsing a laser to produce power pulses of the pulsed printing beam in synchronization with the moves, such that delivery of the power pulses is synchronized with arrival at the predefined locations; and
receiving sensed power delivery to the predefined locations to control initiation of the moves between the predefined locations.

13. The method of claim 12, further comprising receiving feedback in a closed loop, the feedback indicating arrival at the predefined locations, and using the feedback to control timing of power pulse delivery.

14. The method of claim 12, further comprising adjusting a peak power of the pulsed printing beam using a continuously variable power supply.

15. The method of claim 12, further comprising selecting between superpulse and continuous wave modes of operation based on a density of the predefined locations.

* * * * *

UNITED STATES PATENT AND TRADEMARK OFFICE
CERTIFICATE OF CORRECTION

PATENT NO. : 7,394,479 B2
APPLICATION NO. : 11/071671
DATED : July 1, 2008
INVENTOR(S) : Shlomo Assa et al.

Page 1 of 1

It is certified that error appears in the above-identified patent and that said Letters Patent is hereby corrected as shown below:

Title page, item (73) Assignee, replace "Marken" with -- Markem --.

Signed and Sealed this

Fourteenth Day of October, 2008

JON W. DUDAS
*Director of the United States Patent and Trademark Office*